United States Patent
Kifuku et al.

(10) Patent No.: US 9,405,940 B2
(45) Date of Patent: Aug. 2, 2016

(54) PRINTING DEVICE AND CONTROL METHOD OF PRINTING A BARCODE WITH A COMBINATION OF PRESET AND ADDED CORRECTION INFORMATION FOR A SPECIFIED RECORDING MEDIUM

(71) Applicant: Seiko Epson Corporation, Tokyo (JP)

(72) Inventors: Tomoharu Kifuku, Matsumoto (JP); Koji Yamada, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/336,320

(22) Filed: Jul. 21, 2014

(65) Prior Publication Data

US 2015/0029559 A1    Jan. 29, 2015

(30) Foreign Application Priority Data

Jul. 25, 2013   (JP) .................. 2013-154270

(51) Int. Cl.
```
H04N 1/23      (2006.01)
G06K 15/02     (2006.01)
G06K 19/06     (2006.01)
G06K 1/12      (2006.01)
H04N 1/32      (2006.01)
```
(52) U.S. Cl.
CPC ............ *G06K 1/121* (2013.01); *G06K 15/1868* (2013.01); *G06K 19/06028* (2013.01); *H04N 1/32144* (2013.01)

(58) Field of Classification Search
USPC ........................................... 400/74, 103, 583
See application file for complete search history.

(56) References Cited

U.S. PATENT DOCUMENTS

| | | | | |
|---|---|---|---|---|
| 6,032,863 A * | 3/2000 | Nethery, III | ........... | G06K 1/121 235/375 |
| 7,025,269 B2 * | 4/2006 | Marshall | ................ | G06K 1/121 235/462.01 |
| 8,186,594 B2 * | 5/2012 | Uzawa | ................... | G06K 1/121 235/375 |
| 8,810,853 B2 * | 8/2014 | Kataoka | ................ | G06F 3/1208 358/1.2 |
| 9,167,127 B2 * | 10/2015 | Takada | ................ | H04N 1/00233 |
| 2008/0203177 A1 * | 8/2008 | Yumoto | ........................ | 235/494 |
| 2008/0304891 A1 | 12/2008 | Saijo et al. | | |
| 2009/0072035 A1 * | 3/2009 | Ota | .......................... | 235/462.16 |
| 2009/0128838 A1 * | 5/2009 | Yamamoto | ..................... | 358/1.9 |
| 2015/0254479 A1 * | 9/2015 | Kifuku | ................... | G06K 1/121 358/1.6 |

FOREIGN PATENT DOCUMENTS

| | | |
|---|---|---|
| JP | 69-136264 A | 8/1984 |
| JP | 2005-047169 | 2/2005 |
| JP | 2009-193428 | 8/2009 |
| JP | 2012-071532 | 4/2012 |

* cited by examiner

*Primary Examiner* — Scott A Rogers

(57) ABSTRACT

A printer and a control method of a printer can print barcodes appropriately according to a given print medium by means of a simple, easy operation. The printer stores a constant preset value relationally corresponding to each type of print medium. The printer also stores an added correction value that is optionally input for each specific type of print medium. The constant value and the added correction value are used to adjust the printed state of the barcode, e.g. to adjust bar widths within the barcode. The print control unit prints barcodes using the constant value stored in the printer storage unit adjusted with the added correction value.

10 Claims, 4 Drawing Sheets

FIG. 2A

| MEDIA TYPE | CONSTANT |
|---|---|
| PLAIN PAPER/PLAIN PAPER LABELS | −2 |
| FINE PAPER/FINE PAPER LABELS | −1 |
| PLASTIC LABELS | −3 |
| GLOSSY LABELS | 0 |

| MEDIA TYPE | USER CORRECTION VALUE |
|---|---|
| PLAIN PAPER/PLAIN PAPER LABELS | 0 |
| FINE PAPER/FINE PAPER LABELS | 2 |
| PLASTIC LABELS | −1 |
| GLOSSY LABELS | −2 |

50b

PRINTING DEVICE AND CONTROL METHOD OF PRINTING A BARCODE WITH A COMBINATION OF PRESET AND ADDED CORRECTION INFORMATION FOR A SPECIFIED RECORDING MEDIUM

Priority is claimed under 35 U.S.C. §119 to Japanese Application No. 2013-154270 filed on Jul. 25, 2013, which is hereby incorporated by reference in its entirety.

BACKGROUND

1. Technical Field

The present disclosure relates to a printing device and a control method of a printing device.

2. Related Art

Printing devices (printers) for printing barcodes are known from the literature. A barcode has a number of color bars separated by spaces, and conforms to one of various standards such as JAN code, EAN, UPC code, ITF code, CODE39, CODE128, and NW-7. JAN code, EAN, UPC code, ITF code, CODE39, CODE128, and NW-7. The widths of the bars and spaces is determined by the barcode standard, and devices that read the barcodes recognize bars and spaces of the widths defined by the particular standard.

When a barcode is printed with an inkjet printer, however, bar width can vary as a result of ink bleeding and deviation in where the ink droplets land on the printed surface. The barcode may be unreadable if the bar width deviates more than allowed by the standard. Addressing this problem, JP-A-2005-47169 and JP-A-2009-193428 disclose ways to change how a barcode is printed depending on the print medium used for printing. The device of JP-A-2005-47169 changes the dot configuration of the bars and spaces in the barcode according to the type of print medium based on a previously stored correction table. The printing system of JP-A-2009-193428 adjusts the widths of the bars in the barcode according to the type of paper.

There are, however, many different types of print media, and the characteristics of the print medium used by the user can easily differ from the print medium anticipated by the manufacturer of the printer. As a result, even if the printer changes the barcode printing method or bar widths, those changes may not match the print medium, and the printed barcodes may deviate from the barcode standard.

The possibility that the printed barcode will deviate from the standard therefore increases because the barcode printing method and other corrections made by the printer do not match the type of print medium. If the user must specifically control all changes and corrections made to barcode printing, the barcodes can be printed desirably according to the print medium selected by the user. However, this complicates operation for the user, and complicates printing barcodes.

SUMMARY

At least one embodiment of the present invention is directed to the foregoing problem, and provides a printing device that can print barcodes appropriately to the print medium by means of a simple, easy operation, and to a control method of the printing device.

One aspect of at least one embodiment of the present invention is a printing device including: a print unit that prints a barcode on a print medium; a storage unit that stores a preset constant value corresponding to the type of the print medium to adjust how a barcode is printed; a print control unit that prints a barcode with the print unit according to the constant value stored in the storage unit; an acquisition unit that acquires an added correction value input for a specific type of print medium; and a correction value storage unit that stores the added correction value acquired by the acquisition unit relationally to the specified type of print medium. If an added correction value has been stored for a given selected print medium, then the print control unit prints the barcode with the print unit according to the constant value stored in the storage unit and the added correction value stored in the correction value storage unit.

In a printing device according to another aspect of at least one embodiment of the present invention, the storage unit preferably relationally stores constant values in a one-to-one relation to plural predetermined types of print media. When a type of print medium to use is selected from among the plural predetermined types of print media, the print control unit prints the barcode by adjusting the constant value relationally stored in the storage unit and corresponding to the selected type of print medium based on the added correction value stored in the correction value storage unit and corresponding to the selected type of print medium.

A printing device according to another aspect of at least one embodiment of the present invention preferably also has an interface that connects to a host computer. When information specifying the type of print medium to be used is input through the interface, the print control unit prints a barcode by adjusting the constant value relationally stored and corresponding to the specified type of print medium based on the added correction value stored in the correction value storage unit and corresponding to the specified type of print medium.

In a printing device according to another aspect of at least one embodiment of the present invention, the constant value is a first value specifying a change in the width of the barcode printed by the print unit.

In a printing device according to another aspect of at least one embodiment of the present, the added correction value is a second value specifying a change in the width of the barcode printed by the print unit.

In a printing device according to another aspect of at least one embodiment of the present, the print control unit calculates a combined correction value from the constant value and the added correction value, and prints the barcode according to the combined correction value using the print unit.

Another aspect of at least one embodiment of the present invention is a control method of a printing device that prints a barcode on a print medium, the control method including: storing a preset constant value corresponding to the type of the print medium to adjust how a barcode is printed; acquiring and relationally storing an input added correction value to correspond to the print medium type when an added correction value is input for a particular type of print medium; and printing a barcode based on both the constant value and the added correction value.

BRIEF DESCRIPTION OF THE DRAWINGS

FIG. 2A shows an exemplary table of constants stored in the printer storage unit.

FIG. 2B shows an exemplary table of user correction values stored in the printer storage unit.

DESCRIPTION OF EMBODIMENTS

Some embodiments of the present invention are described below with reference to the accompanying figures.

Figure 1:
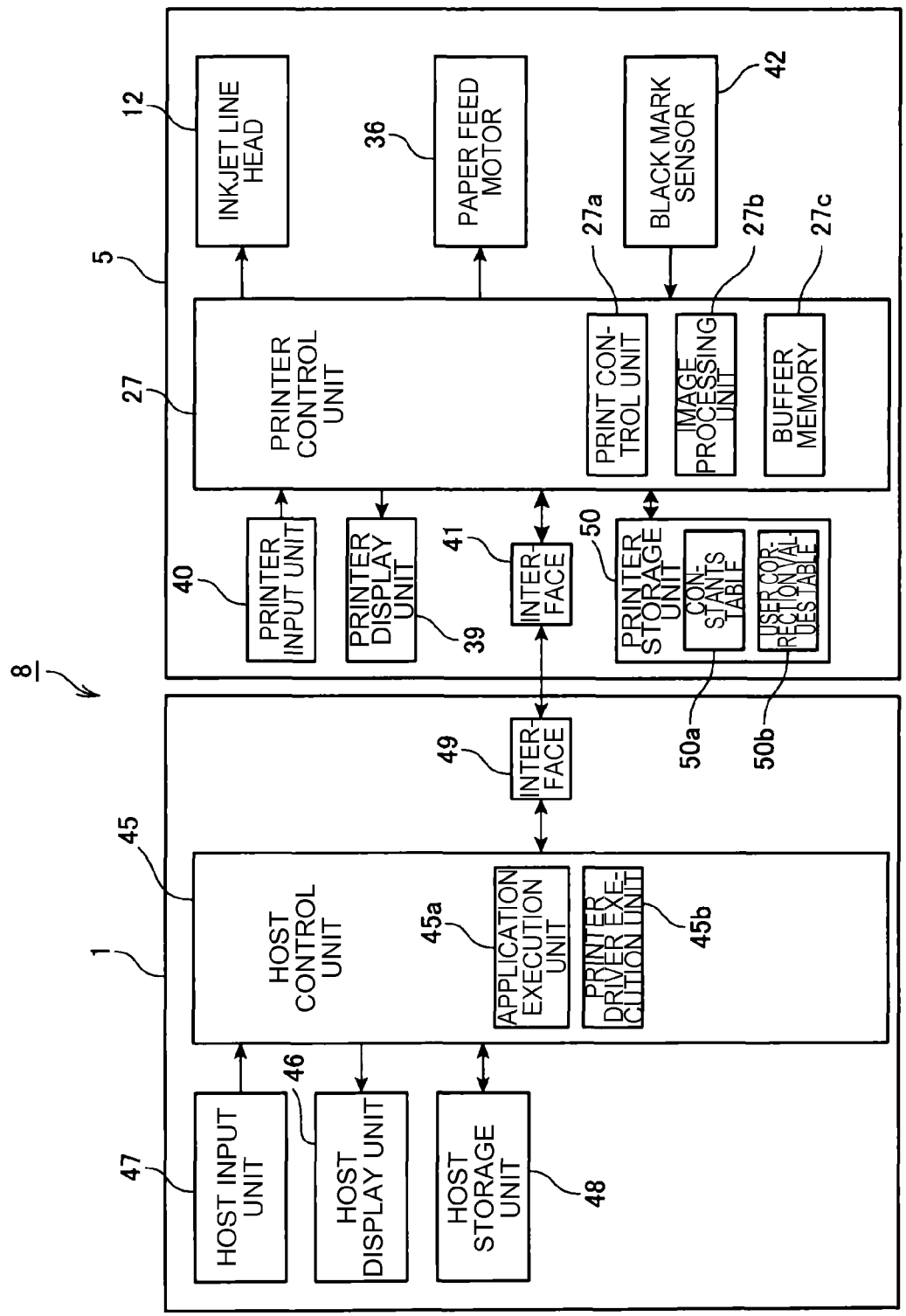
FIG. 1 is a function block diagram of a printing system according to some embodiments of the invention.

FIG. 1 is a function block diagram of a printing system 8 according to some embodiments of the invention.

As shown in FIG. 1, the printing system 8 includes a printer 5 (printing device), and a host computer 1 that controls the printer 5.

The printing system 8 is a printing system in which the host computer 1 outputs print commands and print data to the printer 5 in response to user operations, and the printer 5 prints on print media based on the print commands and print data.

The host computer 1 has a host control unit 45 that controls other parts of the host computer 1. The host control unit 45 has an application execution unit 45a and a printer driver execution unit 45b.

The application execution unit 45a executes application programs such as a text editing program, image editing program, or POS application. When printing is commanded by a user operation, the application execution unit 45a generates and outputs print data for printing the created document or image.

The printer driver execution unit 45b executes a device driver program for controlling the printer 5. The printer driver execution unit 45b generates commands to control the printer 5 and data related to those commands, outputs to the printer 5, and controls printer 5 operation. For example, the printer driver execution unit 45b generates and outputs print data and print commands instructing the printer 5 to print based on the print data output by the application execution unit 45a. Note that the device driver program run by the printer driver execution unit 45b is not limited to a program optimized for the printer 5, and could be a generic device driver program. The program could also be a device driver program for other printer models. In this event, the printer 5 could be configured to process commands and data output by the printer driver execution unit 45b for a different model of printer.

The host computer 1 also has a host display unit 46 for displaying information, a host input unit 47 for detecting operation of the connected input devices, a host storage unit 48 for storing data, and a communication interface 49 for communicating with the printer 5. The host display unit 46 and host input unit 47 are provided for operation by the user. The host storage unit 48 stores (preferably in a non-volatile manner) programs such as the control program, application program, or device driver program run by the host control unit 45, and data related to these programs.

In some embodiments of the invention, the host computer 1 is described generating print commands and print data for printing labels containing a barcode. When the application execution unit 45a instructs printing an image including a barcode, the printer driver execution unit 45b generates print data including the barcode and print commands for printing. The barcode data generated by the application execution unit 45a could, for example, conform to a known standard such as JAN code, EAN, UPC code, ITF code, CODE39, CODE128, or NW-7, or a proprietary code. These barcodes are printed using a barcode font. The printer driver execution unit 45b therefore outputs barcode print data including data specifying the barcode font and the character codes to be printed.

One example of the printer 5 according to this embodiment is an inkjet printer. In this embodiment the printer 5 has an inkjet line head 12 (printhead) with nozzles that eject ink. The inkjet line head 12 is a line head with rows of nozzles across the entire print area in the direction perpendicular to the media conveyance direction. The inkjet line head 12 in this embodiment has a separate nozzle row for each of four colors, cyan (C), magenta (M), yellow (Y), and black (K), and is capable of full-color printing on the print medium. The inkjet line head 12 could obviously be configured to use more colors of ink, or be configured to print with two colors or one color for monochrome printing.

The print media used by the printer 5 could be cut-sheet media that is precut to a specific size, or continuous sheet media, and the sheet media could be paper or plastic media, with or without a coated surface. The continuous sheet media could be roll paper or fanfold paper, for example.

The print medium in the printer 5 according to this embodiment is roll paper or label paper having labels of a specific size with an adhesive coating on the back affixed to a removable liner (backing).

Plural types of roll paper or label paper are used in the printer 5. Examples of print media used in this embodiment include plain paper, fanfold paper, plain paper labels, fine paper labels, plastic label paper, and glossy label paper. The printing surface of plain paper and plain paper labels is plain paper. Fine paper and fine paper labels are typically fanfold paper with ink absorbency and fastness characteristics suited to inkjet printing. Plastic label paper is label paper made with a plastic sheet. Glossy label paper is label paper made with glossy paper that offers excellent ink absorbency, fastness, and chromogenicity, and retains its glossy finish after absorbing ink.

The printer 5 has a printer control unit 27 (print control unit, acquisition unit) that controls other parts of the printer 5. The printer control unit 27 includes a CPU as an operating unit, ROM and RAM. Firmware that can be executed by the CPU and nonvolatile data related to the firmware is in the ROM of the printer control unit 27. Data related to the firmware run by the CPU is also temporarily stored in RAM. The printer control unit 27 may also have other peripheral circuits.

In addition to the inkjet line head 12 described above, a paper feed motor 36, printer display unit 39, printer input unit 40, communication interface 41, black mark sensor 42, and printer storage unit 50 are also connected to the printer control unit 27.

The printer display unit 39 has multiple LEDs or an LCD panel, and displays the operating status of the printer 5 as controlled by the printer control unit 27. The printer input unit 40 includes various switches, and outputs signals corresponding to the operation of the switches to the printer control unit 27. The communication interface 41 is connected to the host computer 1. A black mark sensor 42 is an optical sensor disposed to the conveyance path through which the print medium (label paper or roll paper) is conveyed inside the printer 5, and optically reads the black marks (not shown in the figure) formed on the print medium for positioning. The communication interface 41 (interface) communicates with the host computer 1 according to a specific protocol as controlled by the printer control unit 27.

The paper feed motor 36 turns the conveyance rollers (not shown in the figure) as controlled by the printer control unit 27 to convey the label paper 14. The paper feed motor 36 is preferably a stepper motor, and the amount and direction of rotation of the paper feed motor 36 can be controlled by the printer control unit 27. The black mark sensor 42 detects the black marks while the label paper 14 is being conveyed, and outputs the sensor values to the printer control unit 27.

Function blocks of the printer control unit 27 include a print control unit 27a, image processing unit 27b, and buffer memory 27c. The print control unit 27a and image processing unit 27b are achieved by the CPU running firmware. The buffer memory 27c is a storage area reserved in RAM (not shown in the figure) of the printer control unit 27. Alternatively, the buffer memory 27c could be reserved in the printer storage unit 50, or the buffer memory 27c could be reserved in RAM externally connected to the printer control unit 27.

The printer storage unit 50 (storage unit, correction value storage unit) includes a nonvolatile, rewritable storage medium such as EEPROM, flash memory, or other type of semiconductor memory, or a hard disk drive, and stores data in a nonvolatile and rewriteable manner. The printer storage unit 50 stores programs that are executed by the printer control unit 27, and data including font data that is processed by the printer control unit 27.

The print control unit 27a prints based on the print data and print commands input from the host computer 1 through the interface 41. The print control unit 27a controls the paper feed motor 36 to convey the label paper 14 while driving the inkjet line head 12 to eject ink.

The print control unit 27a calls the image processing unit 27b to process the print data input from the host computer 1. The image processing unit 27b writes the print data to the buffer memory 27c as rasterized image data. The buffer memory 2 7c is a storage area created according to the print resolution of the inkjet line head 12 and the size of the printable area of the printer 5.

Print data including data specifying the barcode font and character codes is output from the host computer 1 in this embodiment. The image processing unit 27b reads the font data stored in the printer storage unit 50, and writes barcode image data to the buffer memory 27c.

The print control unit 27a prints the image written to the buffer memory 27c using the inkjet line head 12. The image data written to the buffer memory 27c is rasterized image data setting print color data for each pixel in a specific number of pixels covering the printable area of the printer 5. Based on a predefined lookup table (LUT), the print control unit 27a converts the color information for each pixel in the image data buffered to the buffer memory 27c to the amount of each color of ink to be ejected by the inkjet line head 12 for each pixel. The print control unit 27a then determines the position and size of each color of ink dot formed by the inkjet line head 12 ejecting ink droplets based on the converted ink volume data, and prints.

The host computer 1 also has a function for correcting the barcode image data written to the buffer memory 27c.

As described above, the print medium used by the printer 5 could be plain paper, fine paper, plain paper labels, fine paper labels, plastic labels, or glossy labels, for example. The surface characteristics of the printing surfaces of these media differ, particularly in the likelihood of ink bleeding. For example, fine paper has excellent ink absorbency and is therefore resistant to bleeding, but plain paper and plastic labels do not have good ink absorption and ink bleeds easily. Excessive bleeding can therefore occur depending on the type of print medium when image data for a barcode written to the buffer memory 27c is printed. This bleeding can increase the width of the black parts (bars) of the barcode, and the printed barcode will be a barcode that does not conform to the barcode standard if the bar width exceeds the standard width, or the space between bars narrows as a result of the bar width increasing. Such barcodes may not be read normally by the barcode reader.

The image processing unit 27b of the printer 5 therefore adjusts the barcode image in buffer memory 27c appropriately to the type of print medium. More specifically, when printing on a print medium that is susceptible to bleeding, the bar width is reduced to compensate for the increase in the bar width due to bleeding. More specifically, the width of the bars in the image data written to the buffer memory 27c is reduced by a number of dots. The process of adjusting the barcode according to the type of print medium is performed by the image processing unit 27b according to constants and user correction values (added correction value) stored in the printer storage unit 50.

FIG. 2A and FIG. 2B show exemplary tables of constants and user correction values stored in the printer storage unit 50, respectively. FIG. 2A shows a constants table 50a, and FIG. 2B shows a user correction values table 50b.

The constants table 50a is a table of preset constants corresponding to different types of print media used by the printer 5. The constants table 50a is stored in the printer storage unit 50 when firmware is written when the printer 5 is shipped from the factory or when the firmware is updated.

The types of media for which constants are set in the constants table 50a correspond to the types of print media that can be used in the printer 5. A subset of constants corresponding to some of the most typical print media could also be stored instead of storing constants for all print media that can be used.

The host computer 1 can set the types of print media using a device driver program run by the printer driver execution unit 45b. The print media type settings in the printer driver execution unit 45b, and the media types for which constants are set in the constants table 50a, preferably match. Four types of print media (plain paper and plain paper labels, fine paper and fine paper labels, plastic labels, and glossy labels) are set in this embodiment, and constants are stored for each of these print media types.

Similarly to the constants, a user correction values table 50b of correction values set by the user for specific media types is also stored in the printer storage unit 50. The printer driver execution unit 45b displays a configuration window on the host computer 1, and the user correction values of the user correction values table 50b are the values input through this configuration window. More specifically, a print media type is selected (specified) using a function of the printer driver execution unit 45b running on the host computer 1, and user correction values for the selected print media type are input through the host input unit 47. The printer driver execution unit 45b then outputs data indicating the input print media type and the user correction values to the printer 5. The printer control unit 27 of the printer 5 then stores the user correction values table 50b in the printer storage unit 50 according to the data input from the host computer 1. The user can thereby set correction values for a desired type of print media.

A constant set in the constants table 50a is a value that increases or decreases the width of bars in the barcode in dot units. The constants in the constants table 50a denote the number of dots a bar width is changed; positive values indicate the number of dots by which the width of a bar is increased, and negative values indicating the number of dots by which the width of a bar is decreased. For example, if the constant is −2 for a media type of plain paper, the media type is set to plain paper by the printer driver execution unit 45b, and printing a barcode is commanded, the printer 5 narrows the bars based on the constants table 50a. More specifically, the image processing unit 27b changes the width of bars in the barcode image data written to the buffer memory 27c based on the change specified by the constant.

The user correction values set in the user correction values table 50b are values that change the width of barcode bars in addition to the constants set in the constants table 50a. Like the constants described above, these correction values indicate the increase or decrease in dots. A positive correction value indicates how many dots the width of the bar increases, and a negative value indicates the number of dots the width decreases. The user correction values in the user correction values table 50b are used in conjunction with the constants in the constants table 50a.

For example, a constant of −1 is set for the media type "fine paper" in the constants table 50a in the table shown in FIG. 2A. A user correction value of 2 is set for the same "fine paper" media type in the user correction values table 50b shown in FIG. 2B. As a result, the image processing unit 27b calculates the sum of the constant plus the user correction value to get the correction value to use. The correction value for fine paper in this example is therefore (−1)+2=1, and the change in the bar width of the barcode is one dot.

The image processing unit 27b thus adds the user correction value from the user correction values table 50b to the constant from the constants table 50a to change the width of bars in a barcode.

The constants table 50a stores values defined by the manufacturer of the printer 5 to enable good quality printing with each type of print media that is used in the printer 5. For example, for each type of media used in the printer 5, a typical or recommended print medium is selected and a constant is set so that a desirable barcode can be printed using that print medium.

However, the user does not necessarily use the print medium recommended by the manufacturer, and the print condition of barcodes printed based on the set constant is not necessarily the best even when the type of print medium is appropriately selected. In this event, the user can set a user correction value that further corrects the constant. A user correction value can be set for each type of print medium, and the corresponding user correction value is automatically applied when the printer driver execution unit 45b selects the type of print medium for printing. In other words, there is no need to manually set the user correction value in every print job.

Figure 3:
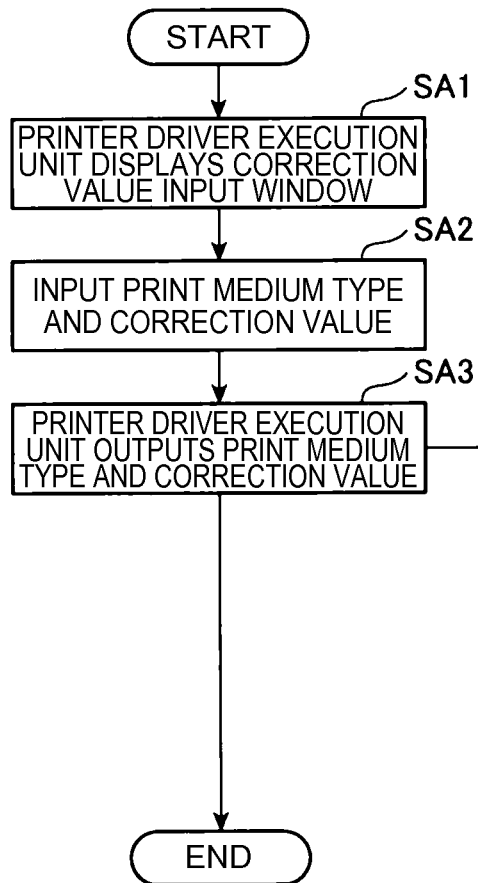
FIG. 3 is a flow chart showing the operation of the printing system when setting user correction values.
Figure 3:
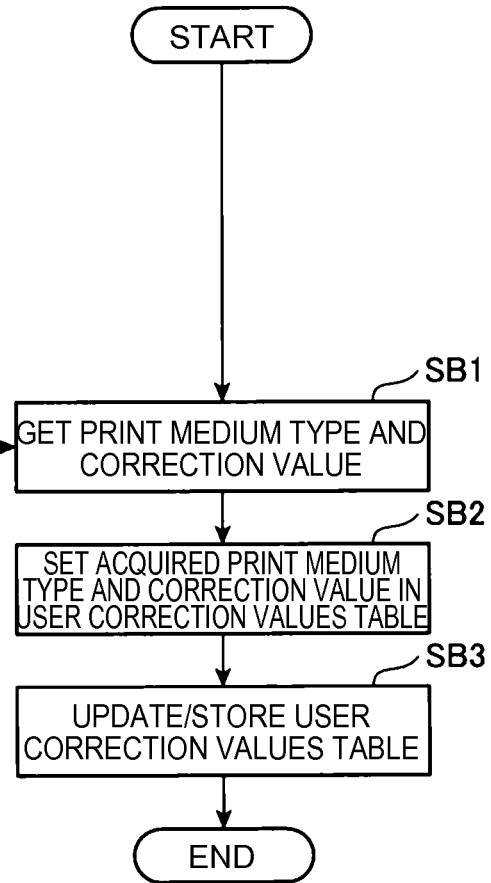

FIG. 3 is a flow chart showing the operation of the printing system 8 when setting a user correction value, column (A) showing the operation of the host computer 1, and (B) the operation of the printer 5.

In response to operation of an input device connected to the host input unit 47, the host computer 1 first displays a window for inputting a user correction value by a function of the printer driver execution unit 45b (step SA1). Next, the type of print medium is selected, and the user correction value corresponding to the selected print medium type is input, through the displayed window (step SA2). The printer driver execution unit 45b then relationally outputs the selected print medium type and input user correction value to the printer 5 (step SA3).

The printer control unit 27 of the printer 5 then acquires the print medium type and user correction value output by the host computer 1 (step SB1). Next, the printer control unit 27 sets the acquired print medium type and user correction value in the user correction values table 50b (step SB2). The printer control unit 27 stores the user correction values table 50b in which setting the user correction value was completed in the printer storage unit 50, or updates the user correction values table 50b stored in the printer storage unit 50 accordingly (step SB3).

This operation enables easily inputting and setting a user correction value corresponding to a particular type of print medium based on operations performed on the host computer 1. A user correction value can also be changed by the same simple operation. Because the user correction value input and set in this operation is used later when printing, barcodes can be printed easily and desirably by previously setting the user correction values.

Figure 4:
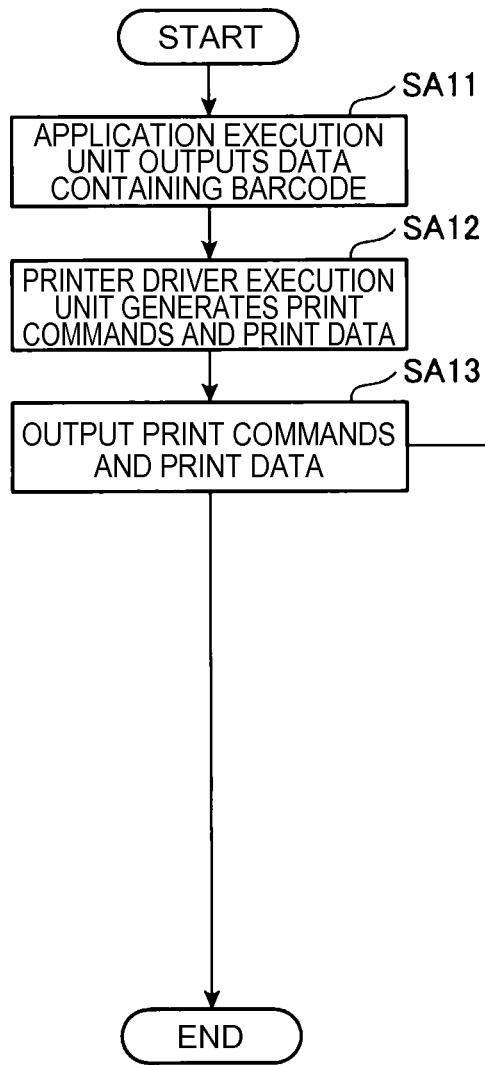
FIG. 4 is a flow chart showing the operation of the printing system when printing.
Figure 4:
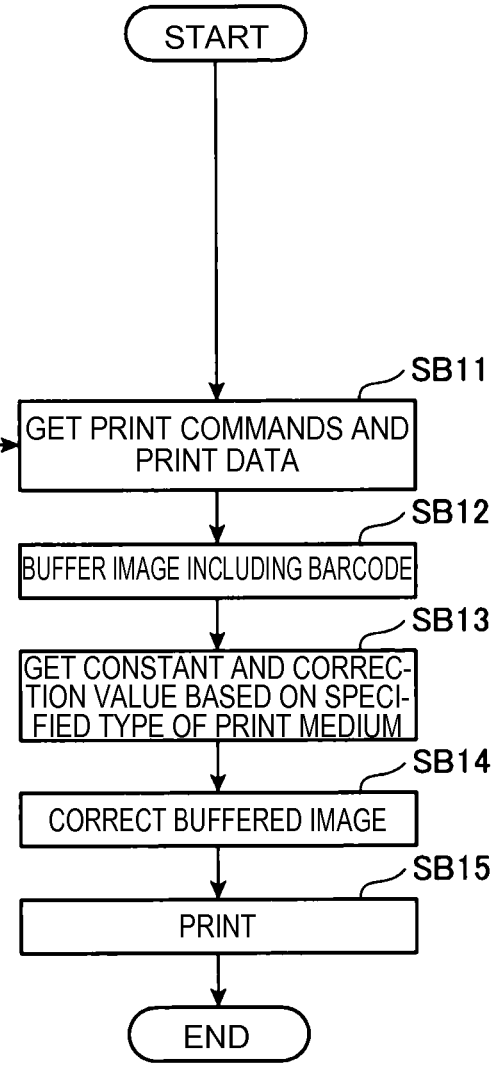

FIG. 4 is a flow chart showing the operation of the printing system 8 when setting a user correction value, column (A) showing the operation of the host computer 1 (SA11 to SA13), and (B) showing the operation of the printer 5 (step SB11 to SB15). Note that the operation shown in FIG. 4 can obviously be executed continuously to the operation shown in FIG. 3.

The application execution unit 45a of the host computer 1 generates information related to an image containing a barcode, and outputs to the printer driver execution unit 45b (step SA11). Based on the information input from the application execution unit 45a, the printer driver execution unit 45b generates print data and commands instructing printing the image (step SA12), and sends the print data and commands to the printer 5 (step SA13). In addition to a command instructing printing, the printer driver execution unit 45b generates a command specifying the print medium type set by operation of the application execution unit 45a or operation of the printer driver execution unit 45b. The type of print medium may also be set by default. In this event, the printer driver execution unit 45b generates a command specifying the default print medium type if the type of print medium is not specifically set otherwise.

The printer control unit 27 of the printer 5 receives the commands and print data sent by the host computer 1 (step SB11). The image processing unit 27b then acquires the barcode font and writes image data including the barcode to the buffer memory 2 7c based on the received commands and print data (step SB12).

The image processing unit 27b references the constants table 50a and user correction values table 50b, and acquires the constant and the user correction value corresponding to the specific type of print medium (step SB13). The image processing unit 27b then applies correction based on the constant and user correction value to the barcode image written to buffer memory 27c (step SB14).

The print control unit 27a converts the image data in the buffer memory 27c to ink volume information for the inkjet line head 12 based on the lookup table, and drives the inkjet line head 12 and paper feed motor 36 to print (step SB15).

As described above, the printer 5 according to this embodiment has an inkjet line head 12 that prints barcodes on print media. The printer 5 also has a printer storage unit 50 and a printer control unit 27. The printer storage unit 50 stores a constants table 50a of constants preset for particular types of recording media for adjusting how barcodes are printed. The printer control unit 27 then prints barcodes with the inkjet line head 12 based on the constants stored in the printer storage unit 50. The printer control unit 27 also gets the user correction value input for a specific type of print medium, and stores the user correction value relationally to the specified print medium type in the printer storage unit 50. The printer control unit 27 then prints barcodes with the inkjet line head 12 based on the user correction value stored in the printer storage unit 50 in conjunction with the constant stored in the printer storage unit 50. As a result, barcode printing is adjusted according to a constant previously stored for a particular type of print medium, and correction based on the constant can be complemented by further correcting barcode printing based on the user correction value. As a result, barcodes can be desirably printed by a simple operation when barcodes can be printed appropriately to the print medium by adjusting printing based on the constant. When barcodes cannot be printed appropriately to the print medium using correction based only on the constant, and printing barcodes more desirably is preferred, further correction is possible based on the user correction value. As a result, barcodes can be printed appropriately to the print medium by means of a simple, easy operation.

The constant is a value that specifies the change in the width of the bars of a barcode printed by the inkjet line head 12. The printer 5 can therefore adjust the width of the bars of the barcode based on a constant previously stored for each type of print medium, and barcodes conforming to a barcode standard can be printed using an inkjet printer 5.

The user correction value is also a value specifying change in the width of the bars of a barcode printed by an inkjet line head 12. How the width of the bars of the barcode is adjusted can therefore be easily changed by specifying a user correction value, and barcodes can be printed appropriately to the print medium. Furthermore, because the printer control unit 27 calculates the actual correction value from the constant and the user correction value to print barcodes with the inkjet line head 12, correction reflecting both the constant and user correction value can be easily applied, and barcodes can be printed desirably.

The printer storage unit 50 stores constants relationally to plural predetermined types of print media. When the type of print medium to use is selected from the plural preset print media types, the printer control unit 27 prints barcodes based on both the constant and the user correction value relationally stored for the type of selected print medium. Printing reflecting correction based on the constant and correction based on the user correction value is therefore possible. As a result, identifying the type of print medium by the user can therefore be simplified, and the appropriate constant can be easily selected.

The printer 5 also has an interface 41 connected to the host computer 1. When information specifying the type of print medium is input through the interface 41, the printer control unit 27 prints the barcodes based on the combined constant and user correction value relationally stored for the input type of print medium. Therefore, when the type of print medium is specified by the host computer 1, barcodes can be printed appropriately to the specified print medium type.

Some embodiments of the invention are described above with reference to a preferred embodiment thereof, but some embodiments of the invention are not limited thereto and can be modified and adapted in many ways without departing from the scope of the accompanying claims.

For example, the foregoing embodiment describes using a constant and a user correction value that change the width of bars in the barcode in dot units. Some embodiments of the invention are not so limited, however, and these could be values that change how much ink is used, the ink droplet landing position, the size of the ink droplets, or other parameter used to print the bars of a barcode. The foregoing embodiment also describes setting a constant and user correction value corresponding to the same type of media in the constants table 50*a* and user correction values table 50*b*. Some embodiments of the invention is not so limited, however, and the number of media types in the user correction values table 50*b* could be fewer than the media types in the constants table 50*a*.

The foregoing embodiment also uses printing linear barcodes composed of bars and spaces based on a known standard such as JAN code, EAN, UPC code, ITF code, CODE39, CODE128, or NW-7, but some embodiments of the invention are not so limited. For example, some embodiments of the invention can also be used for printing QR™ codes and other two-dimensional symbol codes. In this event, when colored printed parts and spaces that are white or colorless are formed by printing, a constant and user correction value that correct the printed size of the colored printed parts can be used to accommodate ink bleeding.

The foregoing embodiment describes an inkjet printer that uses four colors of ink, cyan, magenta, yellow, and black, but some embodiments of the invention can obviously also be applied to printers that use only black ink or printers that use two colors of ink such as red and black, for example.

The function blocks shown in FIG. 1 can be achieved by the cooperation of hardware and software, and do not suggest a specific hardware configuration. Functions of the host computer 1 and printer 5 could also be rendered by other devices externally connected thereto. The host computer 1 and printer 5 can also operate as described above by running programs stored on an externally connected storage medium.

The disclosure being thus described, it will be apparent that it may be varied in many ways. Such variations are not to be regarded as a departure from the spirit and scope of the disclosure, and all such modifications as would be apparent to one skilled in the art are intended to be included within the scope of the following claims.

What is claimed is:

1. A printing device comprising:
   a print unit that prints a barcode on a print medium of a given type;
   a storage unit that stores a preset constant value corresponding to the type of the print medium to adjust how a barcode is printed;
   an acquisition unit that acquires an added correction value input when the type of print medium is specified; and
   a correction value storage unit that stores the added correction value acquired by the acquisition unit relationally to the specified type of print medium; and
   a print control unit that prints a barcode with the print unit according to the preset constant value stored in the storage unit and the added correction value stored in the correction value storage unit;
   wherein:
   the storage unit relationally stores a plurality of said preset constant values in a one-to-one relation to a plurality of predetermined types of print media;
   when one of said plurality of predetermined types of print media is specified for use, the print control unit prints a barcode by combining the preset constant value relationally stored in the storage unit and corresponding to the specified type of print medium with the added correction value stored in the correction value storage unit;
   each preset, constant value is a first value specifying a first change in the width of the bars of the barcode printed by the print unit; and
   each added correction value is a second value specifying a second change in the width of the bars of the barcode printed by the print unit.

2. The printing device described in claim 1, further comprising:
   an interface that connects to a host computer;
   wherein when information specifying the type of print medium is input through the interface, the print control unit prints a barcode by combining the constant value relationally corresponding to specified type of print medium with the added correction value stored in the correction value storage unit.

3. The printing device described in claim 1, wherein:
the print control unit calculates a combined correction value from the preset constant value and the added correction value, and prints the barcode using the print unit based on the combined correction value.

4. The printing device described in claim 1, wherein the inputted added correction value is a user-provided input.

5. The printing device described in claim 1, wherein the added correction value that is combined with the preset constant value also relationally corresponds to the selected type of print medium in a one-to-one manner.

6. The printing device described in claim 1, wherein both the preset constant value and the added correction value specify an adjustment to the width of the bars in the barcode to be printed.

7. The printing device describe in claim 6, wherein the bars of the barcode to be printed have specified widths defined in print dots, and the preset constant value and the added correction value each specify a change to the width of the bars in print dots.

8. The printing device described in claim 1, wherein:
when one of said plurality of predetermined types of print media is specified for use,
if the added correction value is not acquired, then the print control unit prints a barcode according to the preset constant value relationally stored in the storage unit, and
if the added correction value is acquired, then the print control unit prints a barcode by combining the preset constant value relationally stored in the storage unit and corresponding to the specified type of print medium with the added correction value stored in the correction value storage unit.

9. A control method of a printing device that prints a barcode on a print medium of a given type, comprising:
storing a separate preset constant value in a one-to-one correspondence to a plurality of predetermined types of print media to adjust how a barcode is printed on each of said predetermined types of print media;
when a user-added correction value is input for a particular type of print medium, relationally storing the user-added correction value to correspond to the particular type of print medium;
when a type of print medium to use is selected from among the plurality of predetermined types of print media,
if no user-added correction value corresponding to the selected type of print medium is stored, then printing a barcode based on the preset constant value that corresponds to the selected type of print medium, and
if a user-added correction value corresponding to the selected type of print medium is stored, then printing a barcode by combining the preset constant value that corresponds to the selected print medium with the user-added correction value that corresponds to the selected print medium;
wherein:
the preset constant value is a first value specifying a first change in the width of the bars of the barcode; and
the added correction value is a second value specifying a second change in the width of the bars of the barcode.

10. The control method of a printing device described in claim 9, wherein:
when information specifying a type of print medium to be used is input through an interface that connects to a host computer, the barcode is printed by combining the preset constant value that corresponds to the specified type of print medium with the user-added correction value that corresponds to the specified type of print medium.

* * * * *